United States Patent Office 3,227,540
Patented Jan. 4, 1966

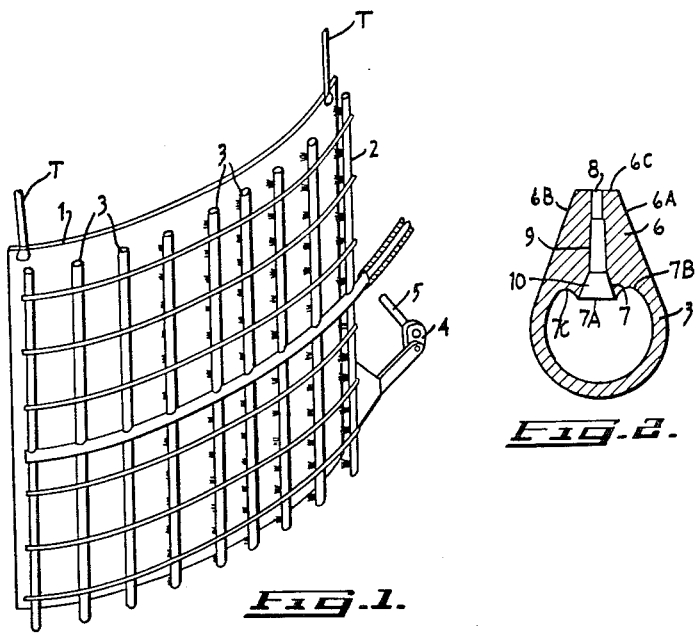
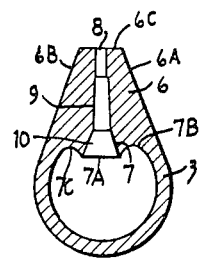
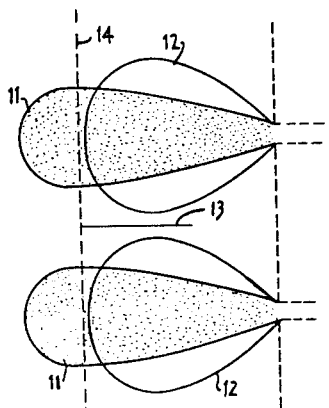
INVENTOR
RONALD E. RICHARDSON

1

3,227,540
BLOWING FRAME FOR TEMPERING
GLASS SHEETS
Ronald E. Richardson, Oshawa, Ontario, Canada, assignor to Pittsburgh Plate Glass Company, Pittsburgh, Pa.
Filed Sept. 30, 1964, Ser. No. 400,432
Claims priority, application Canada, Aug. 15, 1955, 691,318
4 Claims. (Cl. 65—348)

The present application is a continuation-in-part of application, Serial No. 69,156, now abandoned, of Ronald E. Richardson for Improvements in Blowing Frame for Tempering Glass Sheets, filed November 14, 1960, which is a continuation-in-part of application, Serial No. 592,-112 of Ronald E. Richardson for Blowing Frame for Tempering Glass Sheets, filed June 18, 1956, now U.S. Patent 2,968,126.

This invention relates to improvements in apparatus for rapidly cooling heated glass as a step in the manufacture of tempered safety glass.

Such treatment involves the heating of each glass sheet individually in a furnace, with subsequent rapid cooling effected by the application of a large number of small jets of cold air that are caused to play on the surfaces of the glass. In conventional machines for carrying out this treatment, the glass sheet is either held vertical or horizontal, after having been withdrawn from the furnace, to be positioned between a pair of blowing frames each of which consists of a large number of closely spaced, generally parallel air pipes, each pipe having a series of holes disposed along its length to form nozzles. These frames are mounted so that the jets of air project from the nozzles toward the surface of the glass either at an angle or substantially normal thereto. The spacing between the nozzles and the glass surface is usually of the order of a few inches.

The present invention is concerned with an improved structure of nozzle in blowing frames for use in tempering glass sheets. In particular, it is an object of the invention to provide a construction of nozzle that will provide greater throw than has hitherto been obtainable in practice, without extensive spreading of the air.

In obtaining a satisfactory tempered glass, it is just as important to provide for escape of the heated air that has just been in contact with the glass surface than to provide for the continued application of fresh cool air. If the heated air cannot escape rapidly, a condition known as "snuffing" occurs, the new air from the nozzles not coming into adequate cooling contact with the glass surface, since the warm air that cannot escape tends to form a cushion protecting such surface. The nozzles on a blowing frame must be comparatively close together in order to provide for complete coverage of the glass surface, and there is, therefore, only a limited amount of space between the nozzles for escape of the warm air. It is thus important that the jet of air thrown by each nozzle should be comparatively narrow, in order to leave sufficient space between each pair of adjacent jets for the warm air to flow in the reverse direction away from the glass. If the jets of all adjacent nozzles were to overlap, "snuffing" would be inevitable, and the necessity of providing a jet of air of comparatively narrow transverse dimension is thus evident.

Another requirement often important in practice is that the nozzles should be suitable for use with a comparatively low air pressure, say of the order of six to ten pounds per square inch, since this is the pressure usually most cheaply available in air tempering installations. Some installations use very high pressures, but this involves compressors, whereas six to ten pounds per square inch can be produced from turbines. Turbine produced air will normally prove cheaper, and low pressures will eliminate the need for reducing valves, while avoiding the pressure fluctuations commonly associated with high pressure systems.

The nozzles may be bunched together in groups, the individual jets of each group diverging from one another so as to be separate from one another and substantially regularly spaced at the far end of the "throw." By this expedient a closer spacing of nozzles, i.e. more nozzles per unit area of frame, can be employed with less danger of "snuffing." There will be less call for oscillation of the frame when a higher density of jets can be obtained, and, although bunching of the nozzles may not necessarily lead entirely to the elimination of frame oscillation in all applications, it is believed that it will reduce the need for frame oscillation, or conversely minimize any deleterious effects that would otherwise result from absence of such oscillation.

It has also been found desirable as in U.S. Patent 3,125,430 which issued from my co-pending application, Serial No. 804,943, filed April 8, 1959, for a Glass Tempering Method and Apparatus to arrange the passageways in angular relationship to one another such that adjacent edges of the air streams issuing from the passageways within each group overlap and reinforce one another while at the same time areas of increasing cross-section are provided between edges of air streams of adjacent groups with increasing distance from the surface to be tempered. By this expedient the air streams within each group reinforce one another while relatively large and divergent return spaces are provided between the groups so that return flow of spent air is facilitated.

The problem of providing paths of escape for spent air is one which is almost peculiar to the tempering art. In most situations where a fluid has to be delivered to a prescribed location there is no requirement that it be subsequently withdrawn from that location while additional fluid continues to be supplied. For example, in irrigation systems water has to be delivered in an appropriately distributed manner to the ground but once it reaches the ground, it is absorbed and does not provide any obstacle to the delivery of more water. However, when cooling fluid is caused to impinge on a glass sheet, it must not be allowed to remain near the sheet after it has fulfilled its purpose of cooling the glass or "snuffing" occurs. In this connection, it may be added that the use of a blowing frame comprising a plurality of substantially parallel pipes, spaced apart from one another, is of advantage in promoting the ready escape of spent air, by contrast with the use of air boxes which tend to hinder such escape.

Considerable improvement in respect of the throw obtained from a nozzle, can be realised, if the passageway that constitutes the nozzle is made convergent from the inside of the pipe outwardly. The steepness of this convergence, or taper, will preferably be decreased towards the outer end of the passageway, for best results.

The present invention also provides a blowing frame comprising a plurality of substantially parallel elongated air supply pipes, each pipe having a plurality of passageways extending through a wall thereof at an angle to the longitudinal axis of the pipe, the inner end of each such passageway being located nearer said longitudinal axis than the remainder of the wall of the pipe. Thereby each passageway collects fast moving air from a location removed from the relatively slowly moving layer of air near the wall of the pipe. Preferably, this projection of the passageways into the pipe is achieved by forming each passageway as a re-entrant portion of the wall of the pipe, such re-entrant portion projecting towards the center of the pipe.

The accompanying drawings illustrate by way of example one manner in which the invention may be carried into practice. In these drawings:

FIGURE 1 shows diagrammatically a perspective view of the main elements of a typical blowing frame mounted in a glass tempering machine of the vertical type;

FIGURE 2 shows a transverse cross-section of one of the tempering pipes of this frame, taken along the centre of a nozzle constructed in accordance with the present invention; and FIGURE 3 is a diagram illustrating generally the types of air jets that may be expected with nozzles of the type previously used and with those provided by the invention.

FIGURE 1, which is provided merely by way of further explanation of the foregoing remarks to illustrate in broad terms the structure of a blowing frame, shows a sheet of glass 1 suspended by tongs T before a blowing frame 2 which consists of a series of parallel pipes 3 each formed with a number of nozzles directed towards the glass surfaces. A crank-arm 4 and a shaft 5 are also shown to provide diagrammatic illustration of mechanism for moving the frame 2 orbitally in order to play the air jets over the entire surface of the glass 1. This general structure is conventional, a second blowing frame (not shown) being provided on the other side of the glass sheet for treatment of the other surface.

It is now proposed to consider the particular shape of the passageways constituting the nozzles formed in the so-called tempering pipes 3. A cross section of one of these pipes is seen in FIGURE 2 and it will be apparent that such pipes are of complex shape consisting of a generally cylindrical portion formed with an enlarged protruding section 6 along one side. The enlarged protruding section 6 has a pair convergent side walls 6A and 6B interconnected at one end by a flat end wall 6C. These pipes will conveniently be manufactured as extruded aluminum tubes. It is also important to note that there is a re-entrant ridge 7 extending towards the centre of the pipe radially inwardly of the protruding ridge 6. At intervals along the pipe 3 there are formed passageways which extend through the protruding and re-entrant ridges 6 and 7 to communicate between the interior of the pipe and the exterior thereof. Each such passageway is formed in three portions, namely a truly cylindrical end portion 8 at its exit end, terminating in a flat portion 7A of a ridge 7 intermediate inwardly turned portions 7B and 7C, a gently tapered intermediate portion 9 and a more steeply tapered inner portion 10 formed within the ridge 7. These three portions are coaxial with each other and their surfaces merge smoothly into one another. It has been found practical to form the passageways in these separate portions as a convenient method of providing a passageway having a taper the degree of inclination of which is gradually decreased to zero. It would be difficult to bore a hole of smoothly decreasing taper in one single operation and a satisfactory approximation to such a shape is obtained by the use of the two differently tapered portions 9 and 10 and the cylindrical portion 8. It may be practical to form these holes by means of tools passed along the pipe from one end, but it will normally be simplest to bore a hole in the rear surface of the pipe in alignment with the position to be occupied by the passageway, and, after boring the three portions, to replace the metal removed from the rear of the pipe and make an air-tight connection.

The purpose of the re-entrant ridge 7 is two-fold; firstly to insure that each passageway will collect air from the centre of the air stream in the pipe 3; and secondly, to allow a comparatively long passageway to be formed with minimum increase in the overall dimensions of the pipe.

FIGURE 3 serves to illustrate diagrammatically the improved form of air jet obtained by means of a nozzle formed in accordance with the invention. The envelope 11, seen in this figure, represents the form of jet obtained with a nozzle according to the present invention, compared with the envelope 12 of a jet obtained when using a conventional purely cylindrical passageway to form the nozzle. The greater throw of the jet 11 is most noticeable. It has been found in practice that, when using nozzles according to the invention, the distance between the blowing frame and the glass surface can be significantly increased without giving rise to "snuffing," other factors being equal. The return path available for the heated air between a pair of adjacent nozzles is shown by the arrow 13 in FIGURE 3. In order that the velocity of the air should not be too low when striking the glass, the glass will normally be positioned in relation to the jet 11 somewhat as indicated by the broken line 14 in FIGURE 3. This ability to have the glass rather further away from the frame simplifies the practical problems discussed above which arise when dealing with complex glass shapes. Moreover, the new form of nozzle is expected to be more economical of power, since less cool air will be wasted by dissipation to the sides of the nozzles. In addition, the spaces between the tapered outer walls 6A and 6B of adjacent pipes provide smoother passageways for the escape of heated air.

I claim:

1. A blowing frame for tempering glass sheets comprising a plurality of substantially parallel elongated air supply pipes disposed at substantially equal distances from the surface of a glass sheet to be tempered, each pipe having a plurality of passageways extending through a wall thereof at an angle to a longitudinal axis of the pipe, the entrance disposed interiorly of the pipe of each such passageway being located nearer said longitudinal axis than the remainder of the wall of the said pipe.

2. A blowing frame for tempering glass sheets comprising a plurality of substantially parallel elongated air supply pipes disposed at substantially equal distances from the surface of a glass sheet to be tempered, each pipe having a plurality of passageways extending through a wall thereof at an angle to the longitudinal axis of the pipe, the wall of said pipe having a re-entrant portion projecting towards the center of the pipe and the inner end of each of said passageways being located within said re-entrant portion.

3. A blowing frame for tempering glass sheets comprising a plurality of substantially parallel, elongated air supply pipes, each having a longitudial axis and disposed in such a manner as to be adapted to be positioned at substantially equal distances from the surface of a glass sheet to be tempered, each pipe being of complex shape comprising in cross-section a generally cylindrical portion formed with a large protruding section along one side thereof and a re-entrant ridge extending towards the center of the pipe radially inwardly of the protruding section, each of said pipes having a plurality of passageways extending through said re-entrant ridge and large protruding section to terminate respectively interiorly and exteriorly of the pipe, the entrance interiorly of the pipe being on the re-entrant ridge and thereby being located near the longitudinal axis thereof than the remainder of the wall of the pipe associated therewith.

4. A blowing frame for tempering sheets of glass comprising a plurality of substantially parallel, elongated air supply pipes each having a longitudinal axis, each of said pipes being of a complex shape comprising in cross-section a generally cylindrical portion formed with a large protruding section along one side thereof and a re-entrant ridge extending toward the center of the pipe radially inwardly of said protruding section, said pipes being disposed such that they are adapted to be at substantially equal distances from the surface of a glass sheet to be tempered, each pipe having a plurality of passageways extending through said protruding section and re-entrant ridge and terminating interiorly of the pipe in the re-entrant ridge whereby the entrance to the passageway is disposed nearer the longitudinal axis of the pipe than the remainder of the interior wall of the pipe.

References Cited by the Examiner

UNITED STATES PATENTS

| 2,563,300 | 8/1951 | Aker | 239—547 |
| 2,714,530 | 8/1955 | Shepard | 239—567 X |
| 2,968,126 | 1/1961 | Richardson | 65—348 |
| 3,125,430 | 3/1964 | Richardson | 65—348 |

DONALL H. SYLVESTER, *Primary Examiner.*